June 1, 1965  G. SHAW  3,186,018
BRUSH CONSTRUCTION
Original Filed Aug. 15, 1962  8 Sheets-Sheet 1

INVENTOR.
GILBERT SHAW
BY Morgan, Finnegan, Durham & Pine
ATTORNEYS

June 1, 1965   G. SHAW   3,186,018
BRUSH CONSTRUCTION
Original Filed Aug. 15, 1962   8 Sheets-Sheet 2

INVENTOR.
GILBERT SHAW
BY
Morgan, Finnegan, Durham & Pine
ATTORNEYS

June 1, 1965          G. SHAW          3,186,018

BRUSH CONSTRUCTION

Original Filed Aug. 15, 1962          8 Sheets-Sheet 5

INVENTOR.
GILBERT SHAW

BY

ATTORNEYS

June 1, 1965    G. SHAW    3,186,018
BRUSH CONSTRUCTION
Original Filed Aug. 15, 1962    8 Sheets-Sheet 6

INVENTOR.
GILBERT SHAW
BY
Morgan, Finnegan, Durham & Pine
ATTORNEYS

June 1, 1965  G. SHAW  3,186,018
BRUSH CONSTRUCTION
Original Filed Aug. 15, 1962  8 Sheets-Sheet 7

FIG. 26

FIG. 27
TYPES OF CONFIGURATIONS
IN DOUBLE-SPATULATED FIBRES

| | | | | | | | |
|---|---|---|---|---|---|---|---|
| SECTION A-A FIG. 26 | | | | | | | |
| SECTION B-B FIG. 26 | | | | | | | |
| SECTION C-C FIG. 26 | | | | | | | |

INVENTOR.
GILBERT SHAW
BY
Morgan, Finnegan, Durham & Pine
ATTORNEYS

June 1, 1965

G. SHAW

3,186,018

BRUSH CONSTRUCTION

Original Filed Aug. 15, 1962

INVENTOR.
GILBERT SHAW
BY
Morgan, Finnegan, Durham & Pine
ATTORNEYS

United States Patent Office 3,186,018
Patented June 1, 1965

3,186,018
BRUSH CONSTRUCTION
Gilbert Shaw, Middlebury, Vt.
Original application Aug. 15, 1962, Ser. No. 217,000. Divided and this application May 1, 1963, Ser. No. 283,654
14 Claims. (Cl. 15—159)

The invention relates to improved brush constructions employing synthetic brush fibres.

This application is a division of my copending application Serial No. 217,000, filed August 15, 1962.

During the last twenty-five years, synthetic fibers, mainly in oriented filament form, have found increasing usage as brush fibers. Their acceptance has been brought about as a result of decreasing supplies of natural brush filling materials, the greater demand for natural brush filling materials caused by overall world population growth and greater purchasing power, and the rising trend of natural brush fiber prices that parallels world prices in general.

Although various efforts have been made to modify the shape and composition of synthetic brush fibers to permit closer approximation of the action of natural brush filling material, synthetic materials have in many instances fallen short of the performance of natural materials. Brush manufacturing methods, highly developed for handling natural materials, have remained essentially unchanged in the face of replacement of natural materials by synthetics and have never fully utilized the basic physical properties of synthetic brush filling materials.

The need for improved synthetic brush fibers and brush constructions can be illustrated by describing the major desirable properties of natural fibers, and by reviewing the efforts that have been made to make synthetic fibers more acceptable in the past.

Hog bristles are admirably suited for use in paint brushes and other uses. They possess a diameter reduction in the direction of the working or painting end. The attendant decrease in stiffness in the direction of the working end is highly desirable because of the flexing hand imparted to a brush. At the working end of each hog bristle, the bristle splits into a multiplicity of finer filaments which is customarily called the flower or flag. The flag facilitates smooth application of paint or liquids. As the bristles wear down, the flag continues to split off the main bristle stem so that excellent performance from a painting standpoint continues as the bristle wears. Follicles are present along the length of the bristle stem which add to the paint holding capacity of a hog bristle brush because of capillary action.

Synthetic paint brush fibers have been manufactured with decreasing diameter in the direction of the working or painting end. Machines have been devised to mechanically split or flag the working ends of these fibers. Brushes made using such diametrically tapered and flagged fibers are widely used but they are not completely satisfactory because the smooth tapered stem makes them less effective as a paint holding medium than hog bristle. Also, because the mechanical force applied in painting is barely sufficient to continue splitting the tapered synthetic fiber, there is a tendency for the flag to wear and leave a small circular tip that is a poor paint applicator.

Paint brushes having X cross section fibers rather than solid circular have been devised. These have excellent capillarity and continue to flag in service but as yet, they have not been supplied with decreasing stiffness in the direction of the working ends.

In the instance of brooms which are made using broom corn, the desirable features of broom corn are similar in many respects to those present in hog bristles. The individual corn fibers have a decreasing diameter in the direction of the working or sweeping end. Each fiber has a flower or flag at its sweeping end consisting of about 1 to 8 projections considerably finer than the main tapered stem. The admirable sweeping properties of broom corn are attributable to the flexing action imparted by the decreasing diameters in the direction of the sweeping ends of the individual fibers and by the multiplicity of fine sweeping ends present at the working end of a completed broom.

Less work has been conducted in the direction of developing an adequate synthetic replacement for corn broom because that material is still readily available at reasonably low cost. Standard, uniform solid filaments of circular shape have been used to a considerable extent in so-called linoleum brooms that are used as a substitute for corn brooms. In some instances, filaments have been used which have been manufactured using filaments whose composition consists of two incompatible thermoplastics. These filaments, when oriented, have interfaces of incompatibility running the length of the filaments which split readily when the filaments are subjected to flagging action. Such filaments have not been made with decreasing stiffness in the direction of the working end and show a tendency to split uncontrollably and thereby cause premature brush failure.

Thus, an ideal synthetic brush fiber should be one which has decreasing stiffness, not necessarily decreasing diameter, in the direction of the working end; be such that it may be readily flagged; be of such shape that the mechanical forces to which it is subjected during sweeping service cause flagging to continue as the fiber wears; have maximum tip surface exposed to the direction of the sweeping or paint application; and, when capillarity is required, have grooves the length of the filament to assist in liquid retention.

Objects and advantages of the invention will be set forth in part hereinafter and in part will be obvious herefrom, or may be learned by practice with the invention, the same being realized and attained by means of the steps, methods, combinations and improvements pointed out in the appended claims.

The invention consists in the novel steps, methods, combinations and improvements herein shown and described.

The objects of this invention will now be described. While this invention is primarily concerned with the production of brushes comprising a family of compressible, synthetic fibers which are increasingly flattened in a controlled, continuous manner along at least part of their length so that the flattened portion of the family of filaments has an increasing reduction in thickness; it should be realized that the principles of this invention are applicable to situations wherein: (1) the family of compressible, synthetic fibers are flattened in a controlled, intermittent or discontinuous manner along at least part of their length and/or (2) the family of compressible, synthetic fibers are controllably flattened along at least part of their length so that the flattened portion of the family of filaments does not necessarily have an increasing reduction in thickness. In the discussion which follows, for convenience sake, the term "spatulating" is used herein to designate the flattening of a family of compressible synthetic filaments along their length in a controlled manner in accordance with this invention, which results in the production of flattened fiber portions along their length which for convenience sake are designated "spatulated portions" or "spatulations."

An object of this invention is to provide a brush comprising a family of compressible, synthetic brush fibers which have been controllably flattened or spatulated along at least part of their length to provide spatulations; said fibers being supported at one common end to provide the desired brush construction. A still further object of this invention is to provide a brush of the type set forth in the foregoing object wherein the spatulations are heat set. Another object of this invention is to provide a brush comprising synthetic brush fibers which are compressible and which can be controllably spatulated to provide spatulations which give a greater projected working surface for a given stiffness in the direction of application than any of the presently known synthetic brush fibers. A further object of this invention is to provide a brush of the type set forth in the foregoing object wherein the spatulations are heat-set.

Another object of this invention is to provide a spatulated brush construction having a plurality of synthetic brush fibers which are increasingly spatulated in the direction of their working ends, the fibers being held in the brush block in such a manner that the spatulations are in general parallel alignment at right angles to the direction of sweeping or application. Yet a further object of this invention is to provide a brush construction of the type set forth in the foregoing object wherein the spatulations are heat set.

A still further object of this invention is to provide a brush construction employing a family of spatulated fibers wherein the fibers adjoining one common end are increasingly spatulated in the direction of said commond end, and a second part adjoining the other common end is spatulated in a direction 90° from the spatulating direction of the first mentioned spatulated part, the second mentioned spatulated part being supported in such a manner to maintain the 90° relationship of the spatulating directions of the first-mentioned and second-mentioned spatulated parts.

Another object of the invention is to provide a shaped brush construction comprising a brush fiber support and a family of spatulated synthetic brush fibers supported thereby, said fibers being spatulated at the common support end, said support comprising spatulated fiber ends fused to a solid mass to which said family of spatulated fibers is fused.

Another object of this invention is to provide an improved brush construction comprising a brush fiber support and a family of synthetic brush fibers supported thereby; said support comprising fiber ends fused to a solid mass to which said family of fibers is fused, and said fused support having means for attaching a brush handle thereto. A further object is to provide a brush construction of the type mentioned in the foregoing object wherein the family of filaments are spatulated along at least part of their length.

Another object of this invention is to provide an improved brush construction comprising a brush fiber support including an integral handle, and a family of synthetic brush fibers supported thereby; said support comprising fiber ends fused to a solid mass to which said family of fibers is fused. A further object is to provide a brush construction of the type mentioned in the foregoing object wherein the family of filaments are spatulated along at least part of their length.

In the drawings:

FIG. 29 illustrates diagrammatically the formation of a brush construction wherein a brush block having means for attachment of a handle is formed from melted non-working ends of brush fibers fused to a solid mass welded to the family of fibers of the brush construction.

FIG. 30 is a front elevational view of a handle adapted to be screwed into the threaded portion of the brush construction of FIG. 29 to form a brush and handle combination shown as a front elevational view in FIG. 31.

FIG. 32 is a front elevational view of a brush construction formed in accordance with the present invention wherein the brush block is provided with a tapered hole adapted to receive a complementary projection on the handle shown as a front elevational view in FIG. 33.

FIG. 34 is a diagrammatic view of a mold arrangement used in the formation of a brush having a tent-like construction.

FIG. 35 is a diagrammatic view of the brush construction formed by using the mold arrangement of FIG. 34.

FIG. 36 is a diagrammatic view of a mold arrangement used in the formation of a brush construction having parallel rows of fibers. The brush construction is shown diagrammatically in FIG. 37.

FIG. 38 is a diagrammatic view of a brush formed in accordance with this invention wherein there is provided a brush block with attaching device of extremely thin plastic.

It has been found that improved brush constructions may be produced by employing as brush fibers a family of synthetic fibers which are increasingly spatulated in the direction of one common end, the fibers at the other common end being supported in such a manner to maintain general parallel alignment of the fiber spatulation. In such brush construction, the major dimension of the flattened or spatulated tips at the working end of the fibers should face the desired direction of sweeping or application. In spatulating synthetic fibers used in accordance with this invention, the fibers must be of such nature that they are compressible and capable of being permanently deformed when pressure is applied thereto at a temperature below their melting point. In general, synthetic fibers spatulated and used as brush fibers in accordance with this invention are thermoplastic filaments of the type normally used as brush fibers such, for example, as vinyl chloride polymer and copolymer filaments, nylon filaments, etc.

Since many thermoplastic polymers have plastic memories and tend to return to their original shape after deformation, it is desirable that in many cases the deformation needed for proper spatulation be performed at the heat-setting temperature of the material being used and that sufficient cooling be subsequently employed while the deformed or spatulated fiber remains under spatulating compression to lock the stresses of spatulation in position.

Figure 1:
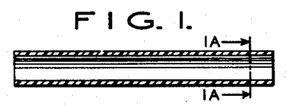
FIG. 1 is a longitudinal sectional view of a hollow cylindrical filament which may be spatulated and used as a brush fiber in producing a brush construction in accordance with this invention.
Figure 1A:
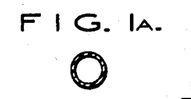
FIG. 1A is a cross-sectional view along the line 1A—1A of FIG. 1.

As indicated above fibers spatulated in accordance with this invention must be compressible and capable of being permanently deformed at a temperature below their melting point. FIGS. 1 to 5 of the drawings illustrate different shaped thermoplastic filaments capable of spatulation. FIG. 1 shows a hollow filament which may be spatulated and used as brush fibers in accordance with this invention. When the filament of FIG. 1 is subjected to compressive force such that deformation or flattening of the fiber increases from one end of the filament to the other, it changes to the configuration illustrated in FIGS. 6–6D of the drawings.

Figure 2:
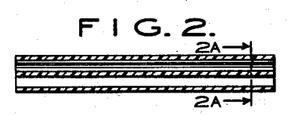
FIG. 2 is a longitudinal sectional view of a hollow striated filament which may be spatulated and used as a bush fiber in producing a brush construction in accordance with this invention.
Figure 2A:
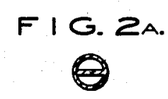
FIG. 2A is a cross-sectional view along the line 2A—2A of FIG. 2.
Figure 3:
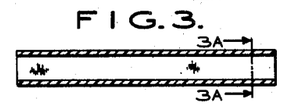
FIG. 3 is a longitudinal sectional view of a hollow square filament which may be spatulated and used as a brush fiber in producing a brush construction in accordance with this invention.
Figures 3A, 4A, 6A:
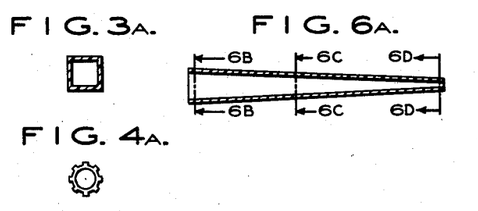
FIG. 3A is a cross-sectional view along the line 3A—3A of FIG. 3.
FIG. 4A is an end view of the filament of FIG. 4.
FIG. 6A is a longitudinal sectional view along the line 6A—6A of FIG. 6.
Figure 4:
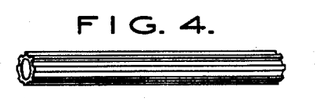
FIG. 4 is a perspective view of a hollow filament having longitudinal grooves which may be spatulated and used as a brush fiber in producing a brush construction in accordance with this invention.
Figure 5:
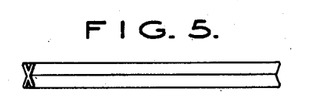
FIG. 5 is a perspective view of an X-shaped filament which may be spatulated and used as a brush fiber in producing a brush construction in accordance with this invention.
Figure 5A:
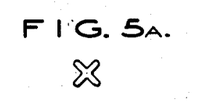
FIG. 5A is an end view of the filament of FIG. 5.

Reference is made to FIGS. 2 to 5 which illustrate other embodiments of filaments which may be spatulated and used as brush fibers in accordance with this invention. FIG. 2 shows an alternate construction where two hollow striations run the length of the fibers. FIG. 3 shows a square hollow fiber and it is apparent that oval or other starting shapes may be used. FIG. 4 shows a cylindrical filament having longitudinal grooves which assist capillarity. FIG. 5 shows an X-shaped filament which obviously already has grooves which are most effective from a capillarity standpoint. When the X-shaped filament of FIG. 5 is subjected to compressive force such that deformation of the fiber increases from one end of the filament to the other, it changes to the configuration shown in FIG. 7. Obviously instead of X-shaped filaments, filaments of other deformable shapes may be used such as those having X, H, etc. structural cross-sections.

In general, the diameter of the starting cylindrical filament of the type shown in FIG. 1 is in the range of 0.005″ to 0.200″ and the wall thickness is generally in the range of 0.001″ to 0.050″ depending upon the rigidity desired in the formed fiber. The filaments shown in FIGS. 2 to 5 would have the same general maximum and minimum dimensions as indicated for the shape of the filament of FIG. 1.

In the case of tubular vinyl chloride-acetate filaments as shown in FIG. 1 and for the other shapes described, the filaments are heated to 212° F. and cooled to 140° F. under the spatulating force at which temperature the stresses of spatulation are locked in place. Further cooling gives additional insurance that the stresses are properly locked.

In the case of tubular filament made using a polymer based upon the condensation of hexamethylene diamine and sebacic acid, spatulation may be performed at 300° F. and since, in nylon of this type, the spatulated shape is permanent at any temperature below 300° F. or the spatulating temperature, only a small amount of cooling is required to set the spatulating deformation.

Figure 6:
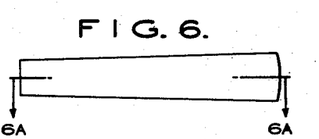
FIG. 6 is a plan view of the hollow filament of FIG. 1 after it has been spatulated.
Figure 6B:
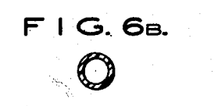
FIGS. 6B, 6C and 6D are cross-sectional views along the lines B—B, C—C and D—D respectively, of FIG. 6A.
Figure 6C:
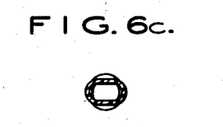
Figure 6D:
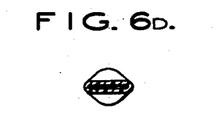
Figure 7:
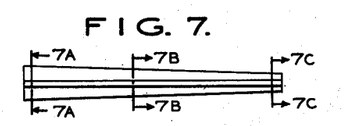
FIG. 7 is a front elevational view of the X-shaped filament of FIG. 5 after it has been spatulated.
Figure 7A:
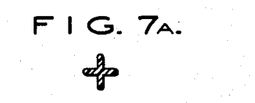
FIGS. 7A, 7B and 7C, respectively, are cross-sectional views along the lines A—A, B—B and C—C, respectively of FIG. 7.
Figure 7B:
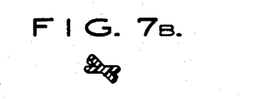
Figure 7C:
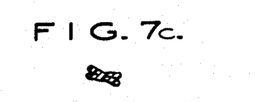
Figure 8:
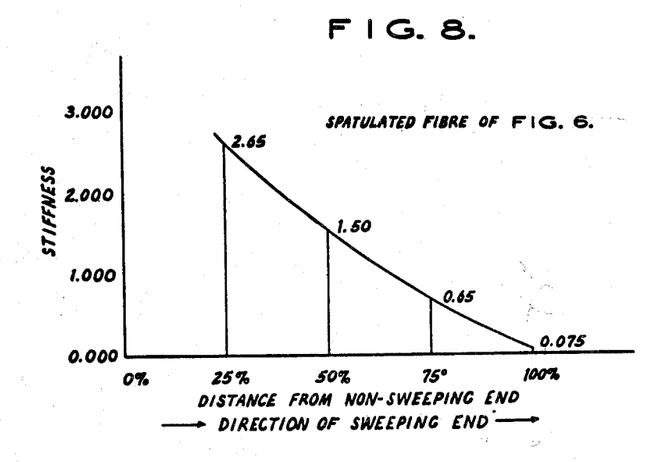
FIGS. 8 and 9 are graphs illustrating the decreases in stiffness and thickness along the length of the spatulated hollow fiber of FIG. 6 as the cross-section of the filament goes from circular at 6B to spatulate at 6D.
Figure 9:
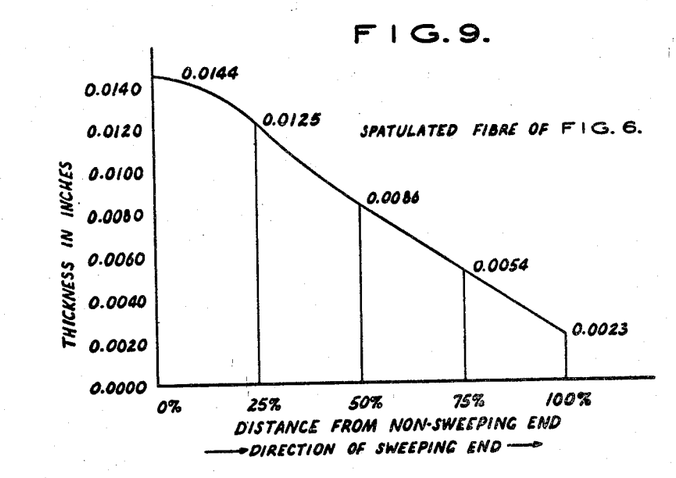
Figure 10:
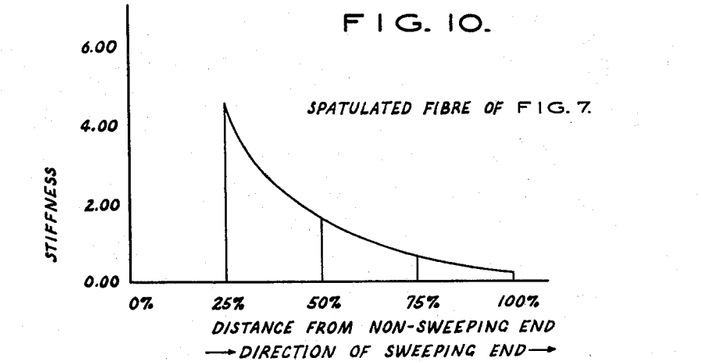
FIGS. 10 and 11 are graphs illustrating the decreases in stiffness and thickness along the length of the X-shaped spatulated fiber of FIG. 7 as the cross-section goes from the X-shape at 7A to the spatulate at 7C.
Figure 11:
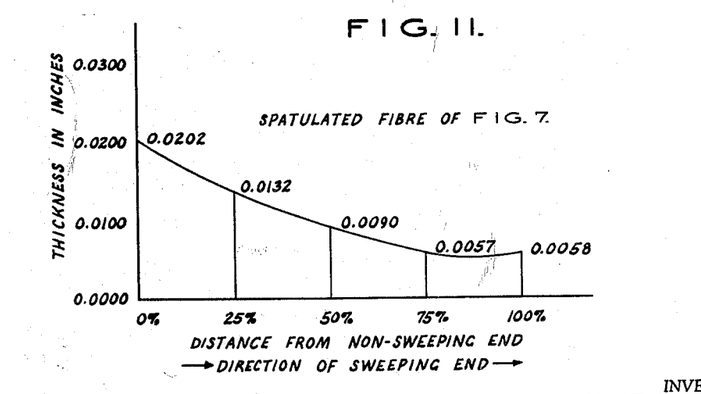
Figure 12:
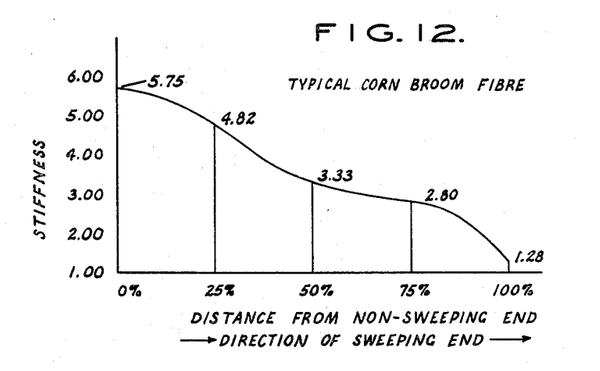
FIGS. 12 and 13 illustrate the diameter and stiffness correlations of corn broom fiber.
Figure 13:
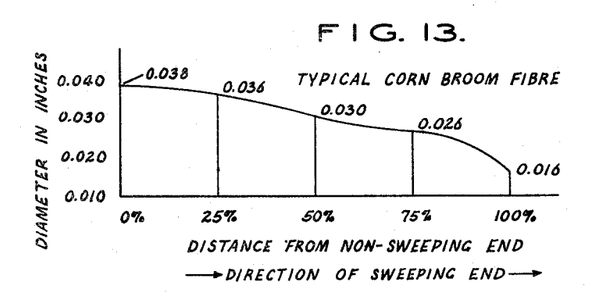

As the cross-section of the formed spatulated filament of FIG. 6 goes from circular at 6B to spatulate at 6D, stiffness and thickness of the filament as measured between spatulated surfaces decreases as shown in the graphs of FIGS. 8 and 9. Spatulation of the X-shaped fiber of FIG. 7 gives stiffness and thickness correlations in graphs of FIGS. 10 and 11. It is apparent that decreasing stiffness in the direction of the working end of spatulated hollow circular fibers as shown in FIG. 6 and spatulated X-shaped fibers as shown in FIG. 7 can, through proper design, be made to simulate in the direction of sweeping the stiffness characteristics of corn broom fiber the diameter and stiffness correlations of which are shown in the graphs of FIGS. 12 and 13.

The flattened spatulate working ends of fibers as shown in FIG. 6 and FIG. 7 flag much more readily than does a solid circular shape and the forces applied to such spatulated product during usage are such that flagging continues as the brush wears.

Figures 14, 15:
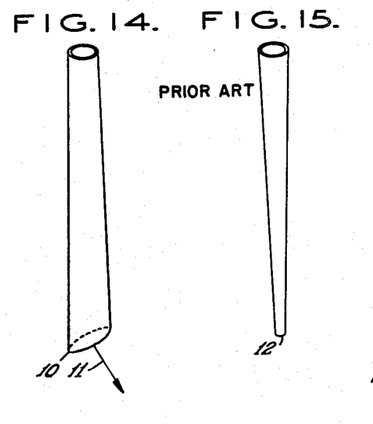
FIG. 14 is a diagrammatic view of a spatulated fiber used in producing the brush construction of this invention which illustrates how the working spatulated end covers a much larger sweeping area than would the small tip of a conventional filament of the type shown in FIG. 15 which has a reduced diameter in the direction of the working end.

It is apparent from FIG. 14 that the spatulated end 10 of a fiber, used as a brush fiber in accordance with this invention, covers a much larger sweeping area in the direction of sweeping, 11, than would the small tip, 12, of a filament having reducing diameter in the direction of the working end as shown in FIG. 15. The spatulated fiber is therefore a more effective sweeping medium.

Thus, the spatulated synthetic thermoplastic brush fibers used in accordance with this invention have been shown to possess all of the elements of an ideal brush fiber previously listed.

To realize the full potential of spatulated fibers as brush fibers, it is essential that the family of fibers at their non-working ends be mounted in the fiber support of the brush construction so that the longer dimension of the spatulate ends of all the fibers be aligned at right angles to the direction of sweeping in the same manner that the spatulate end of a single fiber, 10, is shown aligned at right angles to the direction of sweeping, 11, in FIG. 14.

This can be readily done with a brush that has been manufactured by conventional methods previously described using fibers capable of spatulation as the filling material. Insertion of a family of un-spatulated fibers protruding from a brush block into a mold as shown in FIG. 16 followed by a heat-setting cycle adjusted temperature-wise for the thermoplastic being used results in a product in which the spatulate ends are aligned with their major dimension at right angles to the direction of sweeping or painting.

Figure 16:
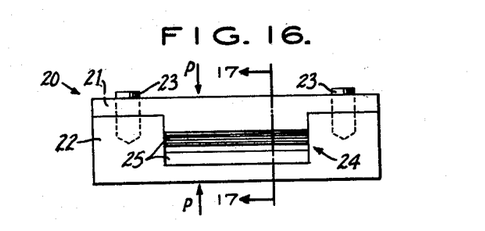
FIG. 16 is a front elevation view of a mold useful in spatulating the filaments of an already formed brush.
Figure 17:
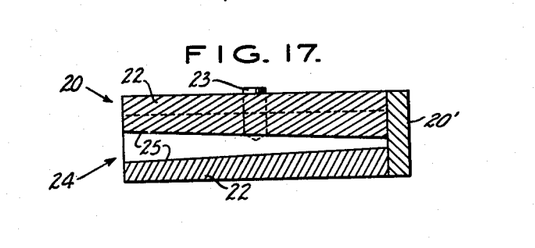
FIG. 17 is a sectional view along the lines 17—17 of FIG. 16.
Figure 18:
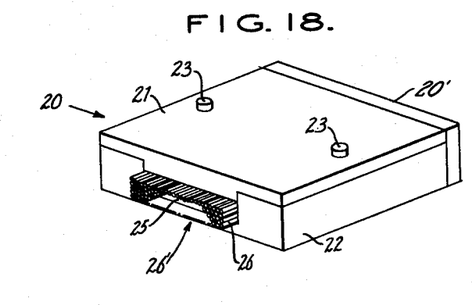
FIG. 18 is a perspective view illustrating how the mold of FIGS. 16 and 17 may be used to spatulate a pre-determined quantity of individual fibers capable of spatulation which are not connected to a brush block.

As shown in FIGS. 16 to 18, the upper part, 21, of the mold, 20, is guided into the lower part, 22, of the mold by means of guide pins, 23, after the unspatulated family of fibers of an already formed brush (not shown) has been placed in the cavity, 24. As shown in FIGURE 17, the mold is provided with an end plate 20'. As the mold closes to apply a pressure P before, during, or after heating the fiber to its suitable forming temperature, the angled surfaces, 25, on the upper part, 21, of the mold, and the lower part, 22, of the mold, compress the fibers and result in overall spatulation of the family of fibers in the direction of the working end of the brush.

Figure 19:
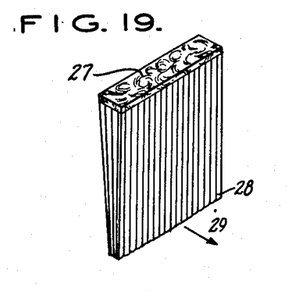
FIG. 19 is a diagrammatic view of a brush-like product spatulated in the manner illustrated in FIG. 18 with the protruding ends heat welded or cemented together.

The above explanation relates to spatulating the filaments of an already formed brush. A pre-determined quantity of individual fibers capable of spatulation which are not connected to a brush block can be processed similarly as in FIG. 18. In this case unconnected un-spatulated fiber ends 26 extend from the closed mold at 26'. These extended ends may be heat-welded or cemented as at 27 in FIG. 19 to give a brush-like product in which the spatulated tips, 28, are aligned with their major dimensions at right angles to the direction of sweeping 29. As indicated heretofore, in the case of a polymer made from hexamethylene diamine and sebacic acid, the heat-sealing temperature used on the protruding ends would be in the order of 450 to 600° F. In the case of vinyl chloride-acetate, the welding temperature would be in the order of 275 to 400° F.

Figure 20:
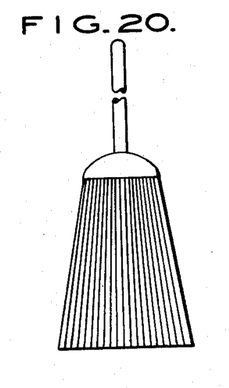
FIG. 20 is a front elevation view of a broom construction employing spaluated filaments used in accordance with this invention.

In a number of instances, it is desirable to make brooms with shape as shown in FIG. 20. This can be accomplished by spatulating the non-working ends in the opposite direction from the spatulation imparted to the working ends.

Figures 21, 22, 23, 24:
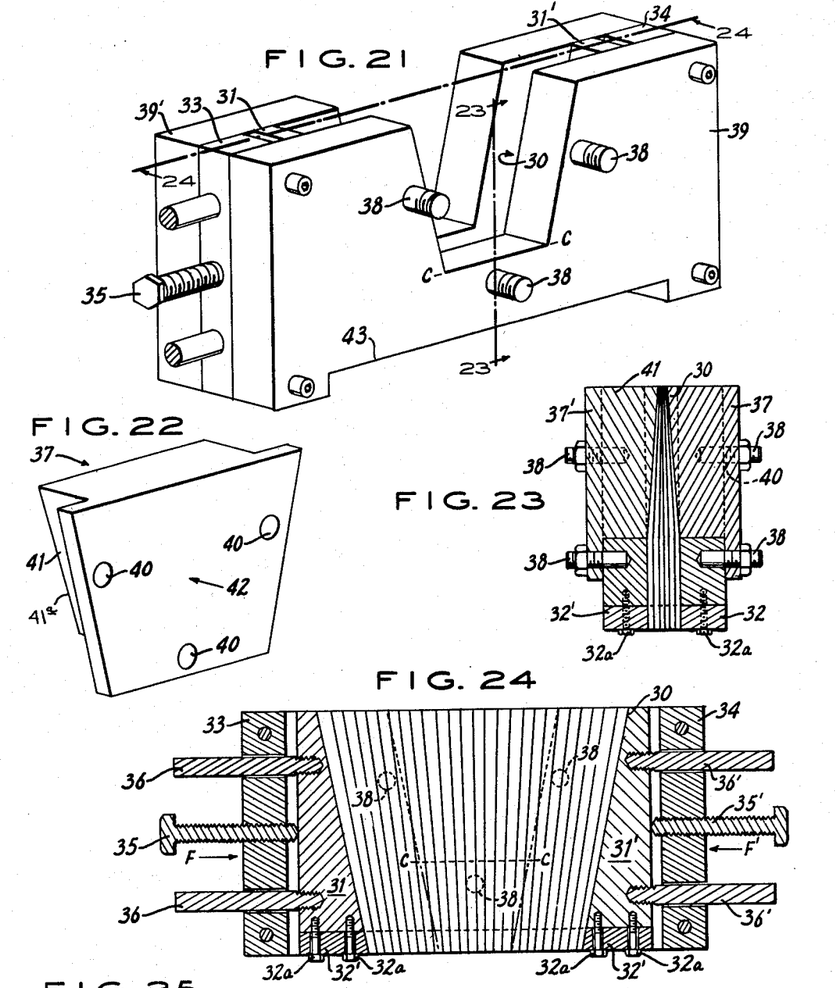
FIG. 21 is a perspective view of a mold base construction used in spatulating a family of filaments at a plurality of parts along their length, said filaments being useful in producing a brush construction of this invention.
FIG. 22 is a perspective view of one of two complementary side plates used in conjunction with the mold base construction of FIG. 21.
FIG. 23 is a sectional view taken along the line 23—23 of FIG. 21 with the complementary side plates in position.
FIG. 24 is a sectional view taken along the line 24—24 of FIG. 21.

This effect may be obtained by placing a pre-determined quantity of individual fibers capable of spatulation in cavity 30 as shown in FIG. 21 and FIG. 24 with the angular members 31, 31' and their lower attachments 32, 32' withdrawn in the direction of the spacer members 33 and 34. The lower attachments 32, 32' are each removably secured to angled members 31, 31' by means of fastening bolts 32ª. Locating studs 35, 35' are in threaded engagement with spacer members 33 and 34 and at their free ends abut angular members 31, 31'. Removably secured to angular members 31, 31' are supporting pins 36, 36' which are slidably received in and extend through spacer members 33 and 34. Rotation of stud members 35, 35' in appropriate directions cause forces to be applied to angular members 31, 31' in directions indicated by F and F'. This causes movement of angular members 31 and 31' (and their attachments 32, 32') towards each other. The aforedescribed movement of the opposing angular members 31, 31' and attachments 32, 32' toward each other enables the angular members 31, 31' and attachments 32, 32' to press against the contained fiber to effect spatulation thereof. This movement may be effected before, during, or after heating the contained fiber to its heat setting temperature. As shown in FIG. 24, the angular members 31, 31' and attachments 32, 32' spatulate the fiber in cavity 30 below line C—C. The height of C—C depends on the quantity of fiber charged into the cavity and the angle of members 31, 31' and 32, 32'. Fiber above C—C which is not compressed by members 31, 31' tends to flare out as shown in FIG. 24.

Side-plate member 37 is placed on pins 38 on member 39 in FIG. 21 by means of holes 40 in plate 37. Integral with plate member 37 is a wedge member 41 having an inclined surface 41ª. A member 37' similar to 37 is placed on pins corresponding to 38 on the opposite side of the assembly on plate 39'. When pressure 42 is applied to the member 37 shown in FIG. 22 and to the corresponding part on pins on member 37', spatulation of the fibers in the cavity above C—C is effected on the working ends of the fibers by surfaces 41ª in a direction opposite to the spatulation applied by members 31, 31' and 32, 32' below line C—C.

Figure 25:
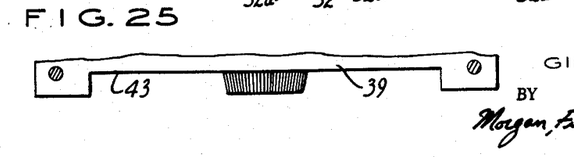
FIG. 25 is a fragmentary front view of protruding spatulated fibers after removal of the bottom plates of the mold construction shown in FIG. 24.

Removal of plate 37 from part 39 and a corresponding plate 37' from part 39' and the two parts 32, 32' from parts 31, 31' in FIG. 24 by removal of fastener bolts 32ª leaves fiber extending below surface 43 of FIG. 21 and as shown in FIG. 25. This fiber extension may be heat-welded or cemented as shown at 27 in FIG. 19. The same choice of temperature cycles exists for this double spatulation as for the single spatulation described in connection with the mold shown in FIG. 16.

Figures 26, 26A, 27:
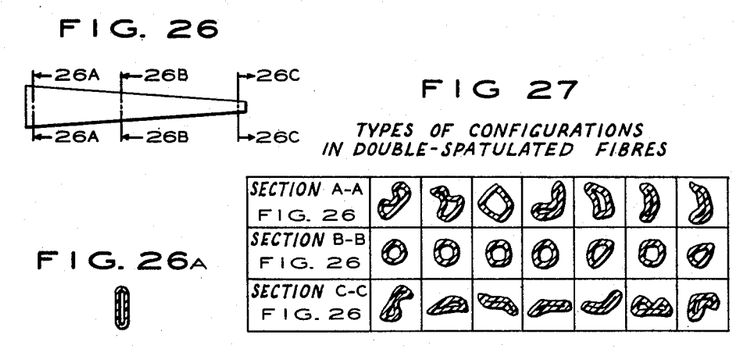
FIG. 26 is a front elevational view of a fiber useful in the production of a brush construction produced in accordance with this invention having double spatulation.
FIGS. 26A to 26C, respectively, are cross-sectional views taken along the lines A—A, B—B, and C—C, respectively, of FIG. 26 of perfectly spatulated fibers.
FIG. 27 illustrates an analysis of actual configurations for the sections locations A—A, B—B and C—C of FIG. 26 based upon a brush double spatulated in the mold of FIGS. 21 to 24.
Figure 26B:
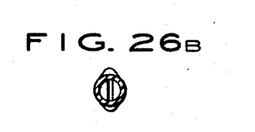
Figure 26C:
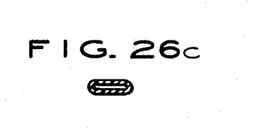

Perfectly spatulated fibers of the double spatulation type would have varying cross-sections as shown in FIG. 26A–26C. However, when a family of fibers is spatulated, interference from adjacent fibers prevents perfect spatulation. Analysis of actual configurations for the section locations shown in FIG. 26 are depicted in FIG. 27. The analysis was based upon a brush double-spatulated in the mold shown in FIGS. 21 to 24.

It should be realized that the analysis shown in FIG. 27 is merely for the purpose of illustrating the different sectional configurations that were obtained for a given set of conditions. Spatulation is a function of spatulating pressure so that various degrees of spatulation other than those shown are obtainable and controllable.

Spatulation of a brush made by conventional methods, and single or double spatulation of a family of individual fibers followed by heat-sealing or cementing of the non-working ends of same to maintain the desired alignment of these fibers has been described.

Heat-sealing or welding is preferable to cementing. It follows then that welding or heat-sealing is an integral part of the manufacture of certain spatulated brushes. This recognition has made apparent a new concept for the manufacture of brushes which goes hand in hand with the concept of spatulated brushes.

This concept consists of melting the non-working ends of fibers capable of spatulation by contact in a heated cavity whose shape corresponds to the shape of a brush block while at the same time molding means in the block for subsequently attaching a handle to the molded block. If the necessary brush handle was sufficiently small, it could be made an integral part of the molded block.

The advantages of this method of making brushes is apparent when one considers the conventional methods presently used for brush manufacture.

In the case of corn brooms, the fibers are arranged around one end of the handle and affixed by spiral wire winding the arranged fibers to the shaft or handle. Construction of each broom is a laborious matter.

Paint brushes are made by arranging the fibers in suitable shape, impregnating the non-painting ends with epoxy, rubber, or other base cements in one end of a metal ferrule, curing the cement, and affixing a handle to the opposite end of the ferrule from that in which the fibers are inserted.

Staple set brushes are made by pre-drilling holes in a plastic or wooden block, inserting fiber tufts bent in U shape into these holes and retaining the tufts with anchors or staples. In some instances the tufts are set with pitch rather than with staples. In other instances, the U shaped tufts may be retained by a wire which retains the tufts and runs from hole to hole.

Other brushes have been made by injection molding the block and coarse fibers simultaneously; injecting hot thermoplastic in the form of a stream around a group of fibers; retaining fibers in U shape in a U shaped metal strip with a wire, and by twisting two wires together with fiber between them.

Individual tufts have been heat-sealed at one end and used to fill single holes in staple-set brushes which the machine missed. There is no known instance where the melted non-working ends of brush fibers have been used to form a finished commercial brush block having means therein for subsequently attaching a handle to the molded block. Nor is it known to form a brush block in the manner described above wherein the handle is made an integral part of the molded block.

Certain thermoplastic brush fibers such as those made from hexamethylene diamine sebacic acid polymers, polycaprolactam and others are of such fluid nature when melted that gravity flow is sufficiently great to fill a cavity having the shape of a brush block if the cavity is heated above the melting point of the thermoplastic fiber being melted. Thus when a family of spatulate or non-spatulated thermoplastic fibers of the type described is permitted to melt and settle into a heated cavity having a shape corresponding to a desired brush block, and providing either means for attaching a handle to the molded brush, or, providing a handle as an integral part of the brush, melting of the fibers occurs, the cavity fills with melted polymer, and the resultant cooled product consists of a block made from melted fibers to which the unmelted fibers are welded in upright position.

Figure 28:
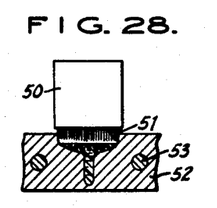
FIGS. 28 and 28A illustrate diagrammatically the formation of a brush construction wherein the brush block and integral handle are formed from melted non-working ends of brush fibers fused to a solid mass welded to the family of fibers of the brush construction.
Figure 28A:
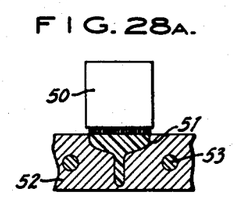
Figure 28B:
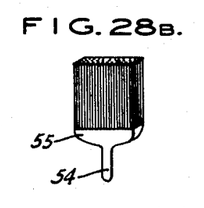
FIG. 28B shows the brush construction resulting from the process illustrated in FIGS. 28 and 28A.

Such an operation is demonstrated in FIGS. 28 and 28A. These figures illustrate the production of a brush construction wherein there is formed an integral handle on the brush block. Spatulated fibers are retained with their working tips in essentially parallel arrangement in retainer 50. As retainer 50 is lowered into cavity 51 in mold 52 which is heated by elements 53 to a temperature above the melting point of the fibers in 50, the fibers melt and form a handle 54 and block 55 to which the fibers in container 50 are welded. FIG. 28B illustrates the appearance of the brush upon removal from the cavity after cooling below the melting point of the material which constitutes the fiber and the melted fiber block.

It is believed that this manner of fabricating brushes has not been commerically developed in the past because many thermoplastics are discolored and degraded when exposed to air for a brief time at the melting temperature. Black or dark-colored brushes so fabricated may not be too unsightly but degradation of the polymer would remain.

It has been established that performance of the function shown in FIGS. 28 and 28A in an inert atmosphere such as nitrogen, carbon dioxide, or vacuum results in a product whose properties are not degraded. When melting is conducted in a vacuum, there is the added advantage that the presence of voids in the melted block is minimized.

It is further believed that the manufacture of a brush in an inert atmosphere permits considerations that were not heretofore practical and applies to existing synthetic fibers as well as the new spatulate form.

Figures 29, 30, 31, 32, 33, 34, 35, 36, 37, 38:
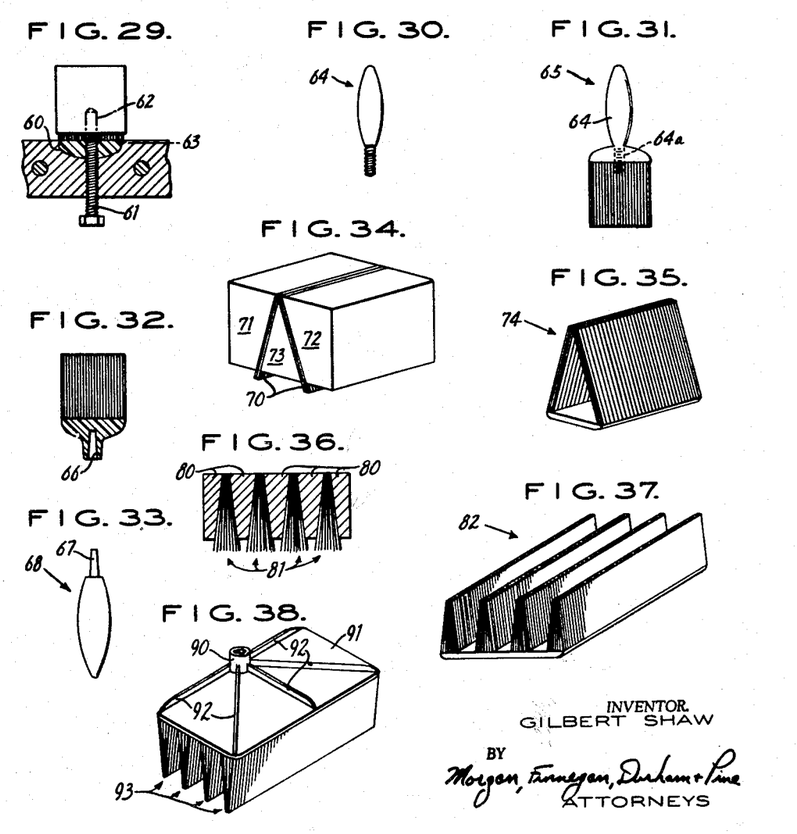

For instance, in FIG. 29 the mold cavity 60 is provided with a removable screw 61, protruding into it. When melted fiber is molded around the screw and the screw is removed after cooling, a female thread is left in the molded block to which a handle with a corresponding male thread can be affixed. Where the fiber being melted is sufficiently compressed as would be the case with fiber spatulated in the mold shown in FIG. 24, the heated screw 61 could be screwed through mold 60 and cut its own thread into the compressed fiber to a point 62 higher than the melted polymer level 63 and would leave a longer thread after cooling and removal of the screw than would result by just covering the thread to the melted fiber level, 63. A brush construction 65 as shown in FIG. 31 is formed by screwing the threaded portion 64ª of handle 64 of FIG. 30 into the complementary threaded portion of the brush construction of FIG. 29.

Similarly, following the described techniques, a block could be formed as in FIG. 32 with a tapered hole 66, into which the projection 67 on the handle 68 of FIG. 33 could be force fitted to give a finished brush. The handle could if desired be made to fit sideways or in any other direction.

Similarly, dissimilar fibers chemically could be spatulated together but it would be preferable that these dissimilar fibers be compatible.

In the manufacture of certain brushes, it is desirable to impart a tent effect to the arranged brush fibers. Such a product may be formed following the techiques previously described in a mold consisting of three parts as shown in FIG. 34. The fibers 70 are retained at the desired angle between parts 71 and 73 and parts 72 and 73. The fiber 70 may be either spatulated or non-spatulated. When the protruding ends of 70 are heat melted in a cavity as previously described a brush structure simulating a tent effect is obtained as shown by the brush construction 74 of FIG. 35.

In FIG. 36 parallel rows of spatulated or non-spatulated fiber are retained by parallel segments 80 of a retaining mold. Fusion of the fiber extensions 81 in a heated cavity as described results in a brush structure 82 as shown in FIG. 37.

It is apparent that structures other than those shown could be devised.

A further advantage of the melt process for making a brush lies in the fact that the block with attaching device 90 as shown in FIG. 38 can be made of extremely thin plastic 91 with minimum thickness webs 92 incorporated in the case structure to provide necessary block stiffness. Use of parallel rows of fibers 93 in such a brush as made in the mold depicted in FIG. 36 results in successive continuous rows of fiber which are a more effective sweeping medium than staggered rows of holes filled with fiber.

In certain instances, it may be desirable to introduce melted polymer into the block cavity to supplement that part provided by melted filament. The advantage would be that such supplementary melted polymer would cost less than an equivalent weight of melted brush fiber. Such supplementary melted polymer cold be added to the cavity as granules which would melt in contact with the heated cavity or as a stream of molten polymer. In either case, part of the block would necessarily consist of melted fiber to secure necessary welding. The supplementary polymer described may not be the same material as the melted brush fiber but it would preferably be one that is compatible with the polymer of which the melted fiber consists.

In the apparatus described hereinbefore for spatulating filaments, conventional solid filaments, e.g. circular solid filaments may be spatulated individually using the thermoplastics noted but in a family of solid circular fibers, with the apparatus used for spatulating the various embodiments described hereinbefore, spatulation is ineffective because the circular solid filaments occupy so much cross-section that they cannot flow into spatulated form. Special apparatus and techniques may be provided, however, for spatulating a family of solid filaments.

Figure 39:
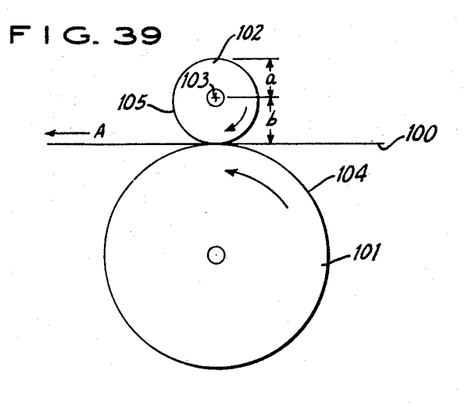
FIG. 39 illustrates diagrammatically the spatulation of a plurality of a band of solid filaments.

Reference is now made to FIG. 39 which illustrates diagrammatically apparatus and techniques for spatulating a family of solid circular filaments. More particularly, a band of fibers 100 is spread on a roll 101 which is in association with an eccentrically mounted smaller roll 102 whose eccentric axis is designated 103. The band of filaments 100, pulled between rolls 101 and 102 by force A, are spatulated over part of their length between surfaces 104 and 105 of rolls 101 and 102, respectively, which are rotated such that these surfaces move in the direction of the band of filaments 100.

As the radial distance between the eccentric axis 103 and surface 105 changes b to a as roll 102 rotates, the degree of spatulation decreases. As the radial distance increases again from the a to b, the degree of spatulation increases.

It is obvious that solid filaments of any cross-section may be spatulated in accordance with the above described technique. It is also clear that various modifications may be employed to effect the desired spatulation. For example, in place of the eccentrically mounted roll 102, one may use a roll of a trefoil shape.

In summary, it has been shown that spatulated synthetic brush fibers more closely approach the desirable properties of certain natural brush fibers than any synthetic brush fiber devised to date; that these spatulate fibers may be spatulated in conventionally made brushes; that spatulated fibers may be melted at their non-working ends to fix the spatulated ends in proper relationship; that the melted non-working ends may form a multiplicity of shapes which would act as the finished brush block; and that by conducting the melting of the non-working ends in a cavity in an inert atmosphere degradation of the color and physical properties of the melted non-working ends is avoided.

It has been shown that the physical properties of heat-setting temperatures, melting characteristics, and structural strength of the melted brush fibers have become for the first time considerations that should be weighed in the manufacture of a brush.

The invention in its broader aspects is not limited to the specific steps, methods, compositions, combinations and improvements described but departures may be made therefrom within the scope of the accompanying claims without departing from the principles of the invention and without sacrificing its chief advantages.

What is claimed is:

1. A brush comprising: a family of synthetic brush fibers of a compressive nature which are increasingly spatulated along at least part of their length to provide increasingly spatulated portions, each increasingly spatulated portion of each increasingly spatulated fiber having a varying cross-sectional shape along the length of the fiber and having a progressively decreasing thickness, a corresponding increasing width and a corresponding decrease in stiffness in a direction normal to the longitudinal axis of the fiber; said fibers being supported at one common end.

2. The brush of claim 1 wherein the spatulated portions of the fibers have been heat-set.

3. A spatulated brush, comprising: a family of synthetic fibers in essentially parallel arrangement whose working ends are increasingly spatulated in the direction of one common end to provide increasingly spatulated portions, each increasingly spatulated portion of each increasingly spatulated fiber having a varying cross-sectional shape along the length of the fiber and having a progressively decreasing thickness, a corresponding increasing width and a corresponding decrease in stiffness in a direction normal to the longitudinal axis of the fiber; the non-working fiber ends at the other common end being secured together by support means so as to maintain general parallel alignment of the spatulated working ends.

4. The spatulated brush of claim 1 wherein the fiber spatulations have been heat-set.

5. A spatulated brush of a predetermined shape, comprising: a family of synthetic fibers whose ends at one end are increasingly spatulated in a direction of one common end to provide increasingly spatulated portions, each increasingly spatulated portion of each increasingly spatulated fiber having a varying cross-sectional shape along the length of the fiber and having a progressively decreasing thickness, a corresponding increasing width and a corresponding decrease in stiffness in a direction normal to the longitudinal axis of the fiber; said spatulated ends being secured together in order to form a brush of a predetermined shape.

6. The spatulated brush of claim 5 wherein the fibers have been heat-set.

7. A spatulated brush, comprising: a family of synthetic fibers; said fibers being increasingly spatulated along their length at more than one part in different spatulating directions to provide increasingly spatulated portions, each increasingly spatulated portion of each increasingly spatulated fiber having a varying cross-sectional shape along the length of the fiber and having a progressively decreasing thickness, a corresponding increasing width and a corresponding decrease in stiffness in a direction normal to the longitudinal axis of the fiber; said fibers being supported at one common end to maintain the angular relationship of the respective spatulated parts and general parallel relationship of the spatulations at each spatulated part.

8. The spatulated brush of claim 7 wherein the fibers have been heat-set.

9. A spatulated brush, comprising: a family of synthetic fibers; the fibers adjoining one common end being increasingly spatulated in the direction of said common end; the fibers adjoining the other common end being increasingly spatulated in the direction of the other common end and in a spatulating direction 90° from the spatulating direction of the first-mentioned spatulated fiber ends to provide increasingly spatulated portions, each increasingly spatulated portion of each increasingly spatulated fibers having a varying cross-sectional shape along the length of the fiber and having a progressively decreasing thickness, a corresponding increasing width and a corresponding decrease in stiffness in a direction normal to the longitudinal axis of the fiber; the second-mentioned spatulated fiber ends being supported in such a manner to maintain the 90° relationship of the spatulating directions of the first-mentioned fiber ends and the second-mentioned fiber ends.

10. The spatulated brush of claim 9 wherein the fibers have been heat-set.

11. A spatulated brush, comprising: a family of synthetic fibers in essentially parallel arrangements, the fibers at the working common end being increasingly spatulated in the direction of said common end to provide increasingly spatulated portions, each increasingly spatulated portion of each increasingly spatulated fiber having a varying cross-sectional shape along the length of the fiber and having a progressively decreasing thickness, a corresponding increasing width and a corresponding decrease in stiffness in a direction normal to the longitudinal axis of the fiber; the fibers at the other common ends being supported by a brush block to maintain the spatulated ends in general parallel relationship; said brush block comprising fiber ends fused to a solid mass to which the non-melted portion of the family is fused.

12. The spatulated brush of claim 11 wherein the fibers have been heat-set.

13. A brush comprising: a family of synthetic fibers in essentially parallel arrangement; a support for said fibers at one end, and an integral handle on said support; said support and integral handle comprising fiber ends fused to a solid mass to which the non-melted portion of the family of fibers is fused, the family of fibers at the common end opposite the support end being increasingly spatulated in the direction of said common end to provide increasingly spatulated portions, each increasingly spatulated portion of each increasingly spatulated fiber having a varying cross-sectional shape along the length of the fiber and having a progressively decreasing thickness, a corresponding increase width and a corresponding decrease in stiffness in a direction normal to the longitudinal axis of the fiber, said support maintaining the fiber spatulations in a general parallel relationship.

14. A brush construction comprising: a family of thermoplastic fibers fused to the thermoplastic block, the fibers at the working end being increasingly spatulated in the direction of one common end to provide increasingly spatulated portions, each increasingly spatulated portion of each increasingly spatulated fiber having a varying cross-sectional shape along the length of the fiber and having a progressively decreasing thickness, a corresponding increasing width and a corresponding decrease in stiffness in a direction normal to the longitudinal axis of the fiber, the composition of said block comprising fiber ends of the family of fibers fused to a solid mass in conjunction with a thermoplatsic material obtained from a source other than the family of fibers.

References Cited by the Examiner
UNITED STATES PATENTS

| | | | |
|---|---|---|---|
| 420,640 | 2/90 | Day | 15—186 X |
| 2,202,292 | 5/40 | Howard | 15—193 X |
| 2,417,750 | 3/47 | Hall | 15—159 |
| 2,433,325 | 12/47 | Slaughter | 15—159.1 |
| 2,443,055 | 6/48 | Reis | 15—159.1 |
| 2,672,640 | 3/54 | Peterson et al. | 15—159 X |
| 2,917,779 | 12/59 | Kurzke et al. | |

CHARLES A. WILLMUTH, *Primary Examiner.*